Dec. 7, 1971  C. M. CORNELISON ET AL  3,625,110
FIRING CIRCUIT AND SAFETY INTERLOCK FOR
AN AUTOMATIC ROCKET LAUNCHER
Filed Nov. 3, 1969  9 Sheets-Sheet 1

FIG. 1

Corbet M. Cornelison
Arthur A. Smith,
INVENTORS.

BY
Harry M. Saragovitz
Edward J. Kelly
Herbert Berl
Harold W. Hilton

Corbet M. Cornelison
Arthur A. Smith,
INVENTORS

FIG. 4

Corbet M. Cornelison
Arthur A. Smith,
INVENTORS.

FIG. 5

Corbet M. Cornelison
Arthur A. Smith,
INVENTORS.

Dec. 7, 1971    C. M. CORNELISON ET AL    3,625,110
FIRING CIRCUIT AND SAFETY INTERLOCK FOR
AN AUTOMATIC ROCKET LAUNCHER Filed Nov. 3, 1969     9 Sheets-Sheet 6

Corbet M Cornelison
Arthur A. Smith,
INVENTORS.

United States Patent Office 3,625,110
Patented Dec. 7, 1971

3,625,110
FIRING CIRCUIT AND SAFETY INTERLOCK FOR AN AUTOMATIC ROCKET LAUNCHER
Corbet M. Cornelison and Arthur A. Smith, Huntsville, Ala., assignors to the United States of America as represented by the Secretary of the Army
Filed Nov. 3, 1969, Ser. No. 873,425
Int. Cl. F41f 3/04
U.S. Cl. 89—1.807          4 Claims

ABSTRACT OF THE DISCLOSURE

An open breech, high rate automatic rocket launching system wherein a pair of rockets are fired from a pair of revolver chambers aligned with a pair of launch tubes while, simultaneously, a second pair of rockets are loaded in a second pair of revolver chambers. More particularly, the invention relates to a firing circuit and safety interlock for such a rocket launcher which provides sequenced duration control electrical firing pulses to rockets, while maintaining electrical isolation of the rockets except in the selected firing position and time period.

The launcher is an automatic high rate, open breech, dual tube launcher, fed by a four cylinder revolver which generates rotary reciprocating motion. The revolver is provided with the mechanism of the present invention for retention therein of the rockets during the reciprocating motion and to effect firing of the rockets at a predetermined time. Two rounds are loaded in the revolver and two are fired each half cycle. A pair of hydraulic double acting cylinders actuated by a pair of solenoid valves serve to actuate the launcher. One hydraulic cylinder rotates the revolver to align the chamber with the launching tubes while the second hydraulic cylinder performs the loading operation, reciprocates the revolver to seal and align the firing chambers with the launching tubes, and retracts to clear the seals, and latch the rounds being loaded into the revolver chamber. A pulsing switch operated by revolver motion serves to actuate the hydraulic cylinders.

The rockets fired from the launcher may be the type which includes a propulsion system having a boost phase and an after-boost sustain phase. The rocket boost phase occurs wholly within the launcher tube at all temperatures. The ignition system of the boost and sustain phases is incorporated in the system in a manner which insures that no debris (wires, metal parts, etc.) is ejected from the rear of the launcher tube of firing. Booster thrust termination and ignition of the sustainer motor occurs within the launcher tube and the tube serves as the combustion chamber for the motors.

SUMMARY OF THE INVENTION

The device of the present invention is a firing circuit and safety interlock mechanism for an automatic rocket launcher. The device serves to apply sequenced duration controlled electrical firing pulses to the rockets for firing thereof from the launcher. Mechanism is provided to electrically isolate the rockets except when they are in the selected firing position.

An object of the present invention therefore is to provide an open breech, high rate, rocket launcher having means for applying electrical energy to the rockets for firing thereof from the launcher only when the rockets are in a predetermined firing position in the launcher.

It is a further object of the present invention to provide such a launcher with mechanism for preventing accidental firing of the rockets from the launcher.

Other objects and advantages will be apparent after a study of the following detailed description taken in conjunction with the drawings:

DESCRIPTION OF THE PREFERRED EMBODIMENT

Figure 1:
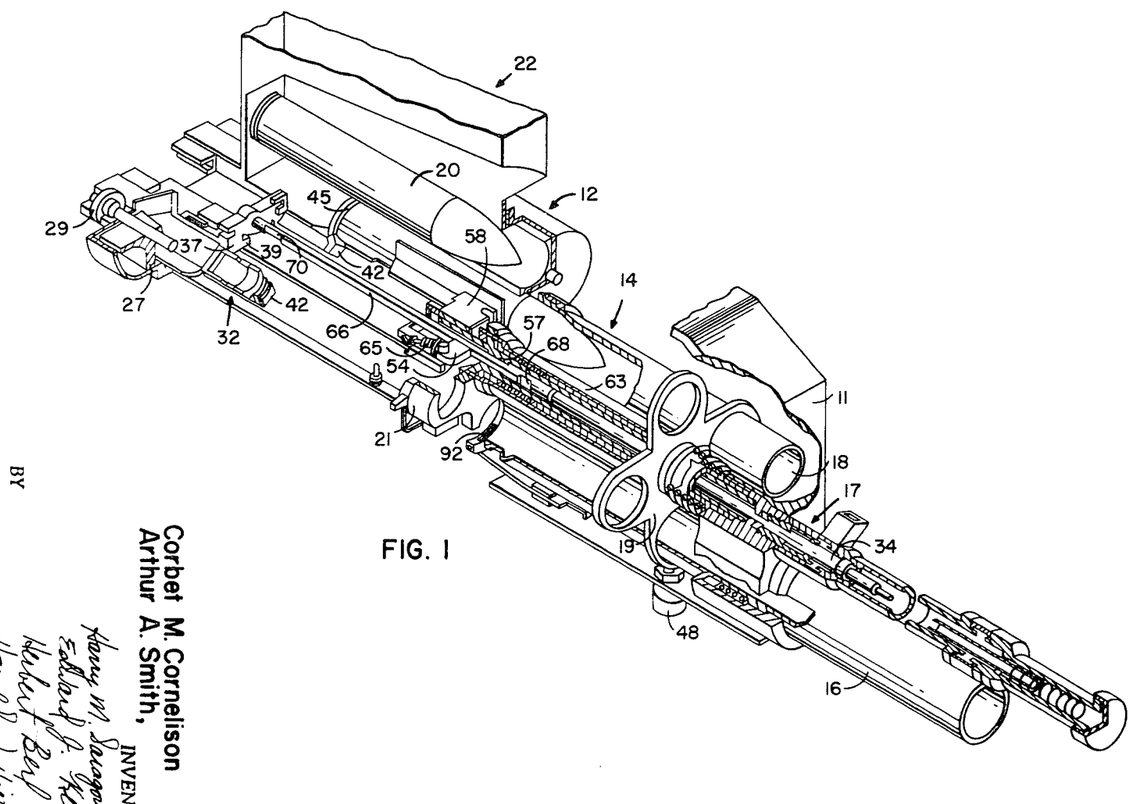
FIG. 1 is a perspective view, partially cut-away, of the launcher having missiles loaded therein.

As shown in FIG. 1, a rocket launcher 10 includes a support frame 11, a loader mechanism 12, a rotatable reciprocal revolver section 14, a pair of launch tubes 16 (one removed for clarity) and a hydraulic actuating assembly 17 for reciprocating movement of revolver 14. The revolver section includes four chambers 18, (only two shown in FIG. 1) supported by a pair of yokes 19 and 21 concentrically about hydraulic actuating assembly 17. Two of the chambers are disposed for alignment with the launch tubes to fire rockets 20 therefrom while the other two chambers are being loaded with another pair of rockets.

Figure 3:
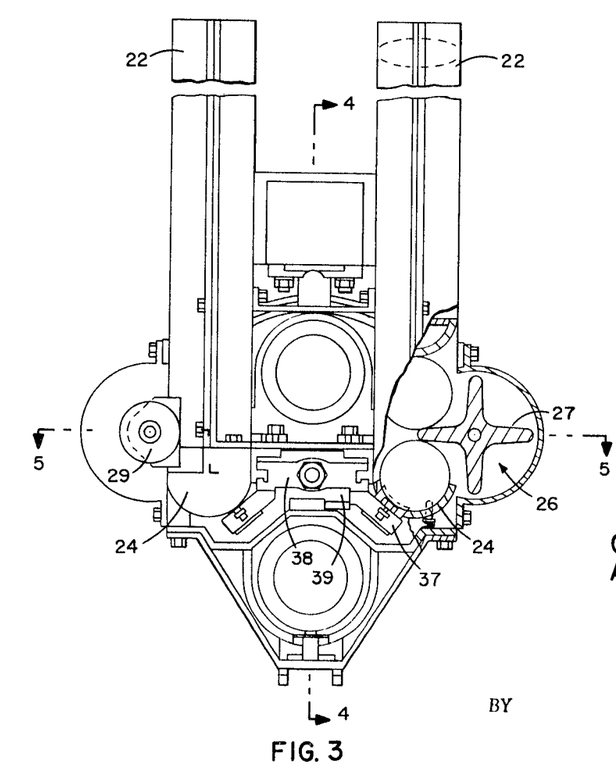
FIG. 3 is an elevational view, partially in section, of the rear of the launcher.

The loader mechanism (FIGS. 1 and 3) includes a pair of loading chutes 22 and a pair of trays 24 communicating with the chutes. Each chute and tray is separated by a starwheel mechanism 26. The movement of the round is downward while in a horizontal position within the loading chute. Movement is effected by the combined force of gravity plus a leaf spring assembly (not shown) disposed at the top of the chutes. The motion is intermittent, all rounds moving simultaneously after the bottom round is rammed forward into the revolver loading chamber. The bottom round is separated from the stack above by the starwheels which support the stack in a horizontal fashion to prevent jamming during the loading stage. The starwheel includes four spokes 27 (FIG. 3) and is made of nylon and engages the rocket along the whole cylindrical body longitudinally. As the starwheel turns, the next spoke of the starwheel positions between the round in the tray and the bottom round in the chute. This allows a friction free surface on which the round to be loaded can slide on without being in contact with the next round to come down. A form sprag clutch 29 (FIGS. 1 and 3) permits only one direction of rotation of the starwheel, holds the round in the loader tray and aligns it with the revolver cylinder into which it is loaded. The two loading chutes straddle the rammer so that two rounds are handled jointly during each ram stroke.

Figure 5:
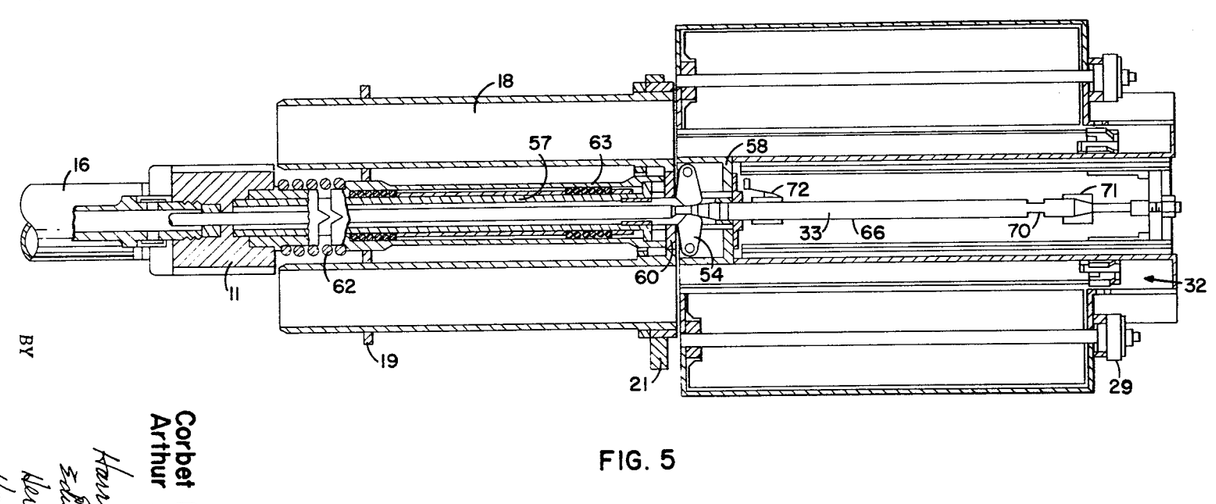
FIG. 5 is a sectional view taken along line 5—5 of FIG. 3.

To move the rounds into the revolver section, there is provided a loading mechanism 32 (FIGS. 1, 6 and 7) powered by a hydraulic piston 34 (FIGS. 1 and 5) for forward and rearward movement of mechanism 32. Mechanism 32 includes a loader arm 33 connected to piston 34 for movement therewith and having a loader support member 38 secured at one end thereof. The piston and arm are mounted along the axis about which each revolver chamber 18 is concentrically disposed.

Loader support member 38 includes a pair of downwardly extending elements 37 (FIGS. 3, 6 and 7) each having a loading member 40 (FIGS. 1 and 6) at the ends thereof. A spring loaded detent 42 is provided at the forward end 44 of member 40 to rest in a detent ring 45 of the rocket (FIG. 1) when member 40 engages the rocket in the loading trays for loading thereof into the revolver cylinders, to maintain positive control over the round during the loading operation. Movement of piston 34 carries the loader assembly forward and positions the rounds in the revolver chamber.

After the loader arm reaches the end of its stroke and the rounds are positioned in the revolver, the chamber is unlatched and caused to move to the rear to permit an angular surface 46 (FIG. 7) on the revolver chamber to engage loader detent 42 causing it to slide down and disengage from rocket detent 45. The face 48 of loading member 40 remains in position and holds the missile forward until the revolver reaches its rear most position and locks into the round by a separate set of detents 92 (FIGS. 8-12) mounted in the revolver cylinders for retention of the round in the revolver cylinder. Detents 92 are mounted in each revolver chamber 18 adjacent the rearward ends thereof for engagement with detent ring 45 of the rocket responsive to insertion of the rocket in the revolver chambers.

Figure 4:
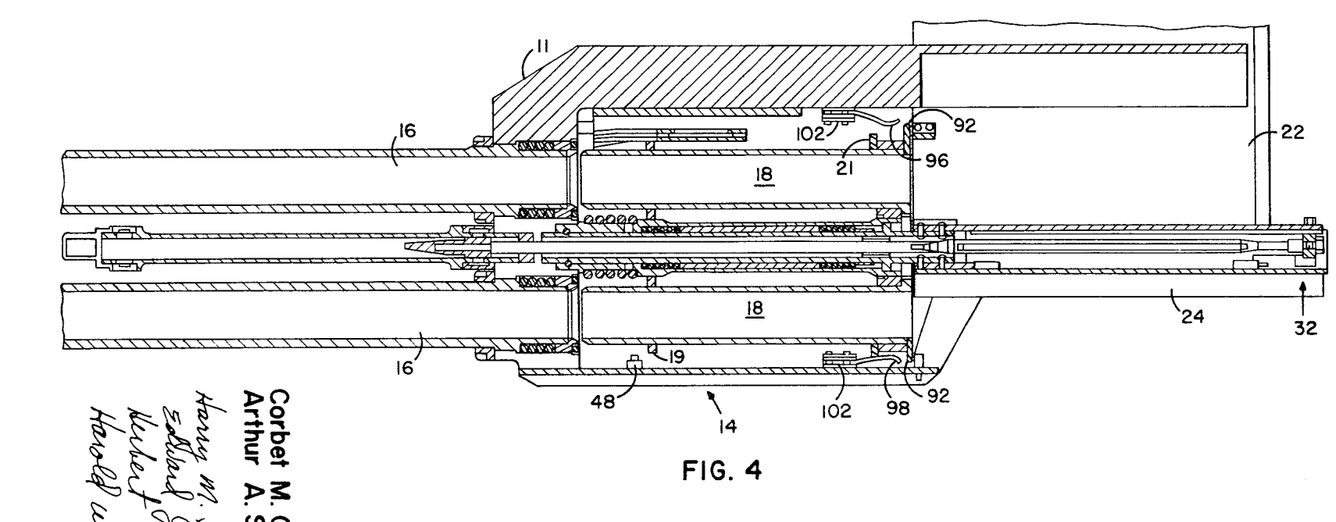
FIG. 4 is a sectional view along line 4—4 of FIG. 3.
Figure 7:
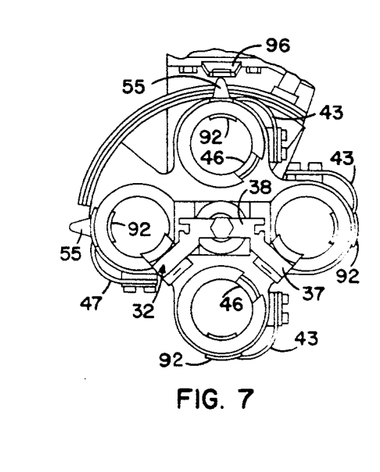
FIG. 7 is a view along line 7—7 of FIG. 6.

As shown in FIG. 7 each detent 92 is biased inwardly by detent springs 43 which provides the necessary force to permit engagement of detents 92 with the rocket detent ring 45 to prevent any motion rearward by the rocket and adequate pressure to prevent any forward motion of the rocket at any portion of the launcher's operation except the high deceleration forces at the forward extreme of the revolvers obturation motion. These high deceleration forces are met by the firing contact springs 96 and 98 (FIGS. 2, 4 and 8) which are mounted externally of the revolver on the frame of the launcher and engages detents 92 at forward obturation of the revolver to retain the rocket in the chamber during the high deceleration forces and to also complete the portion of the firing circuit from the rocket to the firing switches in a manner to be described hereinbelow.

As shown in FIGS. 9, 10, 11, and 12, the detent includes a pawl tip 41 having an arcuate surface, contoured to ride the rocket's skin during loading and to mate with the rockets contact band for controlled retention and firing. The aft edge of the pawl tip includes a ramp 49 to allow ease of loading and disengagement of the rocket from the detent after ignition or when the rocket has misfired and is being ejected by the next rocket being loaded into the chamber.

The forward surface of the pawl tip is sloped at 51 to provide a locking angle with the contact band of the rocket preventing rearward motion of the rocket after engagement of the detent with the contact band.

Figure 11:
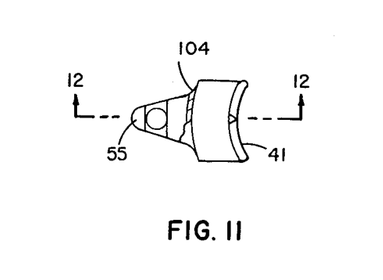
FIG. 11 is an elevational view, partially in section, of another detent of the present invention.
Figure 12:
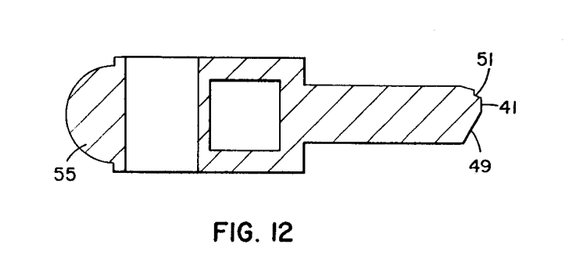
FIG. 12 is an enlarged view along line 12—12 of FIG. 11.

As shown in FIGS. 11 and 12, a pair of detents are provided which are similar as the detent discussed above; however, these detents are provided with a modified external lobe 55 to provide additional height to mate with the spring 96 mounted above the revolver assembly. The function of this detent is identical with the function of the detent shown in FIGS. 9, 10 and 11.

After detents 92 have engaged rocket detent ring 45 to retain the rockets in the revolver, a revolver rotating hydraulic piston assembly 39 (FIGS. 2 and 4) then rotates revolver 14, 90° to align the two empty chambers with the loading trays and the loaded chambers with the launch tubes in a manner to be discussed below.

Figure 6:
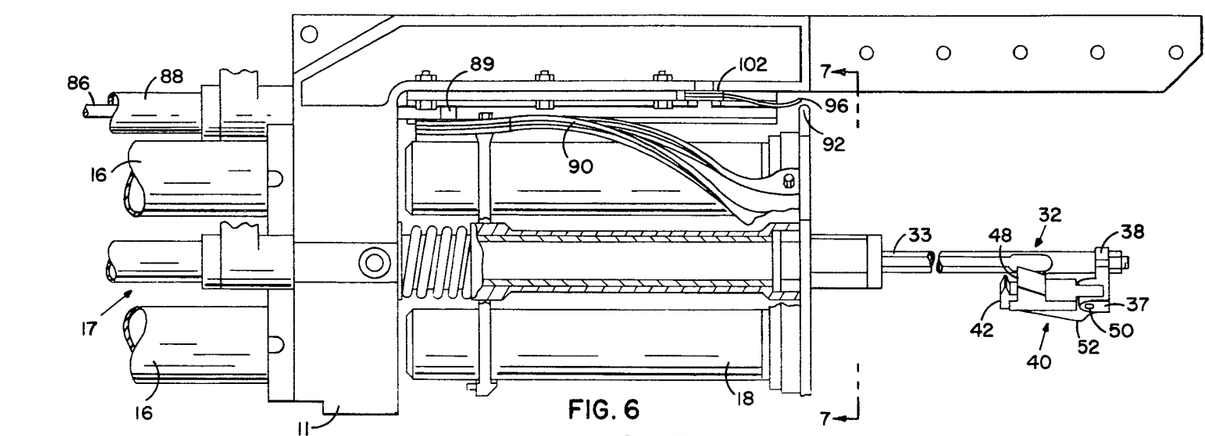
FIG. 6 is an elevational view, partially in section, of the revolver section and loader assembly.

To permit the loader assembly to return to pick up another round for loading thereof, the ram is moved rearward carrying the loading mechanism with it. As shown in FIG. 6 loading members 40 are pivotally mounted to support member 38 at 50 and spring loaded by spring 52 in the support member to retain their initial positions for the loading action. As the loader retracts responsive to rearward movement of piston 32, members 40 are forced to pivot down and ride the body of the next rocket to be loaded, located in the loading trays. When the loader reaches its rearmost position, loading member 40 is biased upward by spring 52, back up behind the round and detents 42 of members 40 engage rocket detent ring 45 for forward movement of the next pair of rockets.

With a pair of rockets in the chambers aligned with the launcher tubes, piston 34 and arm 33 move forward and carries with them the next pair of rockets to the other two chambers of the revolver. With the second pair of rockets in the chambers, piston 34 and arm 33 move slightly forward and carries with it a pair of cam dogs 54 (FIGS. 1 and 5) which engage the revolver causing it to obturate for sealing of the two vertical cylinders of the revolver with the two launch tubes.

To accomplish this, cam dogs 54 are secured in a cam dog housing 58 (FIGS. 1 and 5) which is secured to a hollow revolver support shaft 57 carried about arm 33. A revolver chamber support tube 63 is slidably mounted about support shaft 57 and each chamber 18 is secured to support tube 63 for movement therewith by yokes 19 and 21 responsive to engagement of cam dogs 54 with a plate 60 of the revolver section 14 to force the revolver forward against the force of a spring 62 carried about the cylinder of piston 34 and seated between the revolver support shaft and frame 11. The forward movement of the revolver forces the revolver chambers in sealed relation with the launch tubes.

To permit engagement of cam dogs 54 with the revolver section for forward movement thereof, loader arm 33 is provided on opposite sides thereof with a longitudinal cam 66 (FIGS. 1 and 5) having a pair of recesses 68 and 70 at opposite ends thereof. When piston 34 and arm 33 move forward the cam dogs rise out of forward recess 68 to ride along longitudinal cams 66. In this position, the cam dogs engage pressure plate 60 of the revolver section, moving the revolver section forward into obturation position with the launch tubes and at the same time a cam surface 39 on support 37 (FIGS. 13 and 14) engages a switch 71 to fire the rocket in the top tube. The ram piston 34 continues to a second position (while revolver and tubes are obturated) until a second switch 72 (FIG. 14) is tripped closed and the rocket in the bottom tube is fired. When the piston has reached its forward position of the stroke, the cam dogs fall into the rear recesses 70 of the longitudinal cams and allows the revolver to be pushed back under force of spring 62. As the ram stroke retracts, a spring 63 (FIG. 1) rotates cam dogs 54 in an opposite direction and allows the cam dogs to slide back along the cam track until they drop back into recesses 68. During deobturation a pulsing switch 48 mounted on the frame externally of the revolver is depressed to send a signal to a pair of solenoid valves 78 and 80 (FIG. 14) which retracts piston 34 and initiates the next cycle by energizing the second assembly 39 to rotate the revolver.

To rotate the revolver after a pair of rockets have fired, the second piston assembly 39 (FIGS. 2 and 6) includes a piston 84 (FIG. 14) provided with a rod 86 which extends out of piston cylinder 88. Rod 86 is provided with a cam follower 89 at the end thereof which rides in a sinusoidal cam track assembly 90 disposed about the periphery of the revolver section. After the first pair of rockets have been fired the solenoid valve 80 is actuated to permit hydraulic fluid to move piston 84 of assembly 39 to rotate the revolver section to align the second pair of chambers with the launcher tubes. The same 90° arc is used clockwise and then counter-clockwise for each succeeding cycle of the launcher's operation.

The operating cycle requires that the rocket loader travel from full forward to full aft and full aft to full forward while the revolver hydraulic valve 80 is held in one position. The revolver must rotate while the rocket loader is traveling from full forward to full aft and must be held stationary while the rocket loader is traveling from full aft to full forward (i.e., the cycle ratio of the rocket loader valve 78 to the revolver valve 80 is 2:1). When the rocket loader begins forward travel from full aft, the revolver will forward obturate 0.25 inches and when the rocket loader reaches full forward position, the revolver will rear obturate 0.25 inches. The obturating motion of the revolver will operate pulsing control switch 48 which will provide electrical pulses to control the rocket loader. Only the pulse from revolver rear obturate can be used to control the rotation of the revolver.

The pulses for control are obtained from control switch 48. The switch is closed as the revolver completes rotation, opens as the revolver forward obturates, closes as the revolver rear obturates and opens as the revolver begins rotation. The electrical control system is more fully set forth in an application filed Feb. 4, 1966, Pat. No. 3,331,284, and issued July 18, 1967, by Frank H. Case, Jr., Edgar Losberg and Corbet M. Cornelison for "Electrical Control System for Recoilless Cannon."

The hydraulic actuating valves are two position, two stage solenoid operated, i.e., when the solenoid is energized the hydraulic fluid flows in one direction and when the solenoid is de-energized the fluid flows in the opposite direction.

The rate of fire is 400 to 450 rounds per minute, firing two rounds 50 milliseconds apart on each half cycle.

Figure 13:
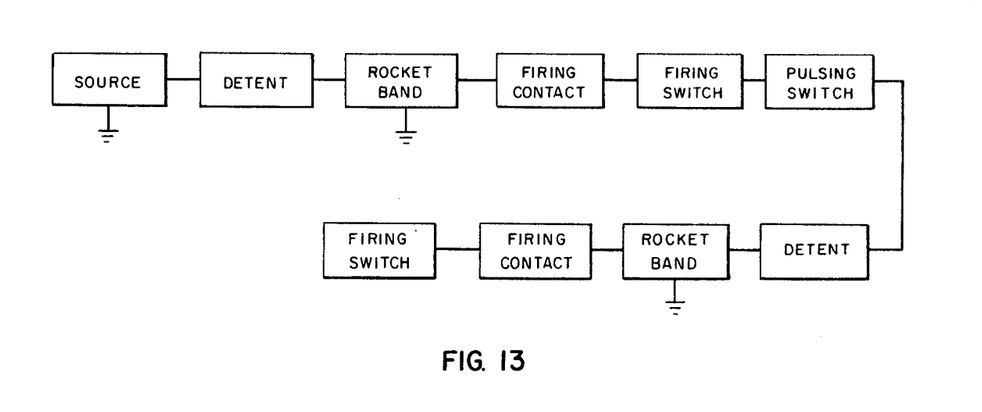
FIG. 13 is a block diagram of the firing circuit.
Figure 14:
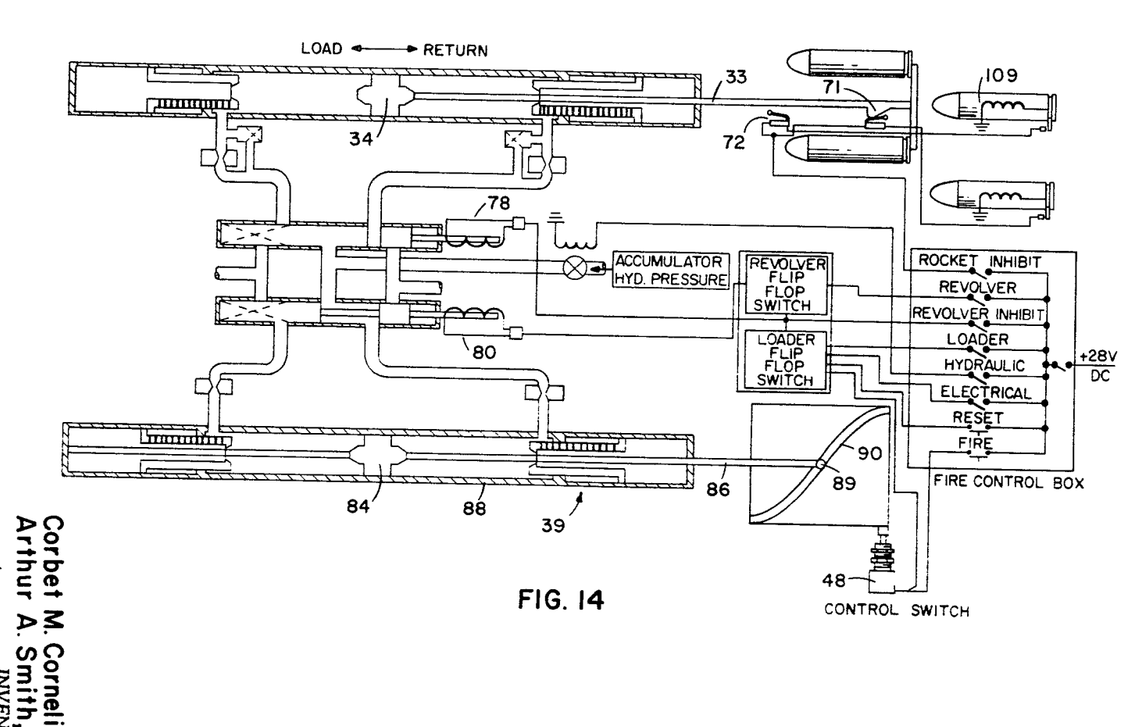
FIG. 14 is a schematic view of the launcher.

The firing of the rockets is schematically shown in FIGS. 12 and 13 and is accomplished by closing the two firing switches, 71 and 72 as discussed above. After the rocket loader begins forward travel, the first switch 71 is closed by movement of the loader mechanism 32 completing the electrical circuit to the top rocket chamber, and as the loader approaches the end of forward travel the second switch 72 is closed as discussed supra, completing the electrical circuit to the bottom rocket chamber.

Figure 2:
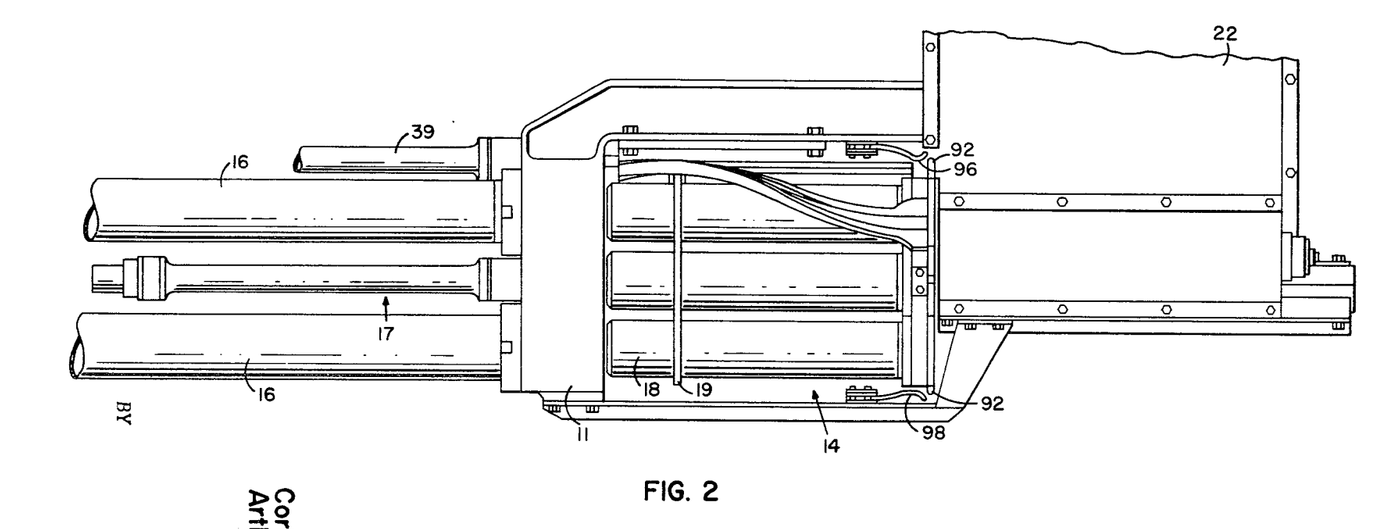
FIG. 2 is an elevational side view of the launcher of the present invention.
Figure 8:
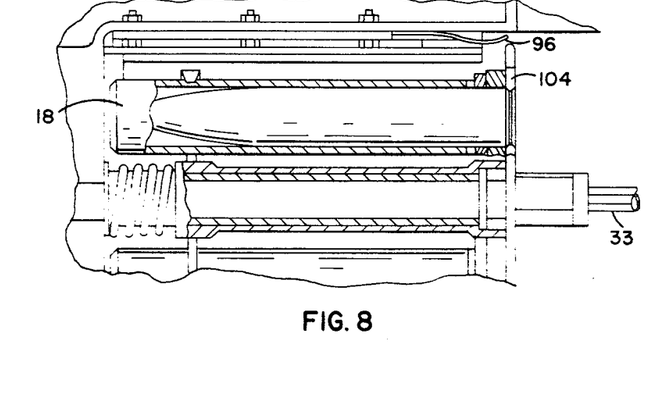
FIG. 8 is an elevational view partially in section, showing one revolver chamber having a rocket therein in firing position and the detents for retaining the rocket in the chamber, and a second revolver chamber in loading position.
Figure 9:
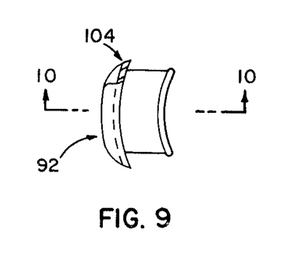
FIG. 9 is an elevational view, partially in section, of the detent mechanism.
Figure 10:
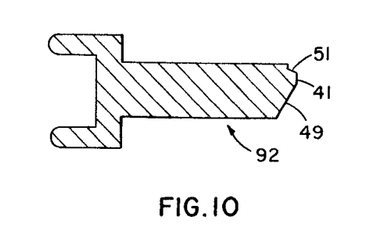
FIG. 10 is a view along line 10—10 of FIG. 9.

To insure that the electrical circuit to the rocket is not completed until the revolver forward obturates and to insure that only the two rockets which are aligned with the launcher tubes will be fired, detent pins 92 are electrically connected to switches 71 and 72 respectively, through springs 96 and 98 mounted externally of the revolver section. When the revolver rotates to its 90-degree rest position (in alignment with the launcher tubes) the detent pins are moved inwardly under spring force to engage contact band 45 on the rocket. The revolver forward obturates and the detention 92 contact springs 96 and 98. At this point in the cycle, the ground contact and firing circuit contacts are closed, leaving only switches 71 and 72 open. The firing switches are closed responsive to loader movement as described, supra, to launch the rockets in sequence which permits the maximum time interval between the pair of rockets which is consistent with the ignition delays, thrust build up and gas evacuation times predicated by the rocket characteristics interrelated with the launcher. As shown in FIGS. 2, 6 and 8, springs 91 and 98 are electrically isolated from the launcher by insulators 102 and detents 92 are electrically isolated from the revolver chamber by insulators 104 which surrounds the sliding body of the detent.

Figure 15:
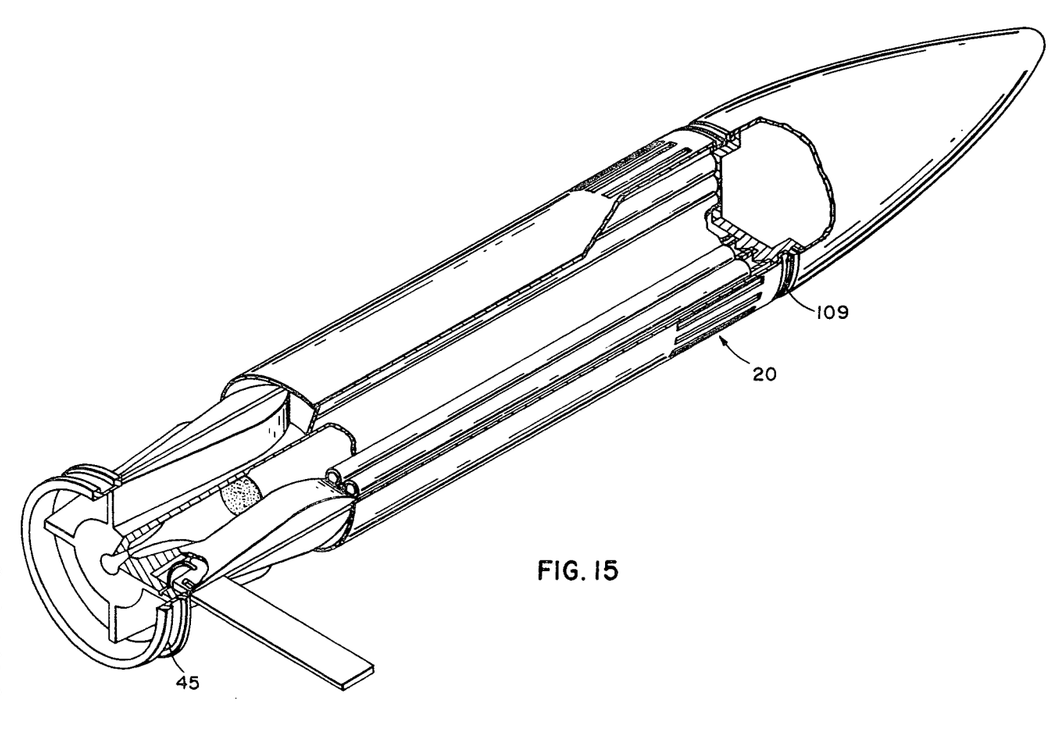
FIG. 15 is a pictorial view of a rocket disposed for firing from the launcher.

Rocket 20 includes booster and sustainer motors and obturating ring 109 located just aft of the head. This ring prevents booster motor gas blow-by and can act as the ground leg of the firing circuit. The contact band 45 is carried in a contact ring and is electrically insulated from the metal parts of the missile and electrically connected to squibs (not shown) in the motors. Detents 92 engage the band to complete the electric circuit to the motors for ignition thereof.

It can, thus, be seen that the firing circuit and safety interlock of the present invention is disposed to provide adequate firing pulses (both power and duration) to rockets in the launcher to insure ignition of the rockets. As noted above, the pulses are sequenced and routed to provide the ignition of only the rockets in the correct firing positions and to fire them at the most advantageous interval.

The controlled passage of the rockets through the automatic launcher provides that the portion of the feeder and loader mechanisms contacting the rockets be coated or made of low friction non-conductive materials. Additionally, when the round enters the firing chamber, the contacts are physically isolated from the ignition circuit and do not engage the contact band of the rocket until all electrical contacts to the firing chamber assembly have been disconnected. The firing chamber moves to the firing position maintaining electrical isolation until it mates with the launch tubes. At this point in the cycle the ground contact (through the obturation band) and the firing contacts (through the detents) are closed, leaving only the firing switches open. The operator then opens and closes the firing switches in a sequence to allow the maximum time interval between the pair of rockets which is consistent with ignition delays, thrust build up and gas evacuation time.

We claim:

1. An open breech, high rate, automatic rocket launcher comprising:

(a) storage means having a plurality of rockets therein;

(b) support means having a pair of launch tubes secured thereto;

(c) a revolver section having a plurality of barrels having chambers therein; said revolver section disposed for rotary movement for alignment of a pair of chambers with said launch tubes and for reciprocating movement between said storage means and said launch tubes for obturation sealing engagement therewith;

(d) loader means disposed for moving a plurality of rockets from said storage means to said chambers of said revolver section, said loader means disposed for energization of the motors of said rockets in said revolver chambers which are in alignment with said launch tubes while simultaneously loading rockets in said chambers which are not in alignment with said launch tubes; and (e) firing circuit means connected to a source of electrical energy for ignition of said rockets in said revolver chambers aligned with said launch tubes responsive to displacement of said loader means;

(f) detent means carried in said revolver chambers for engagement with said rocket in said revolver, said detent means including; a member electrically isolated from and slidably mounted in each said barrel adjacent the ends thereof which are carried adjacent said loader means; a first plurality of springs secured to said revolver section and in engagement with said detent means for biasing said detent means against said rockets for retention of said rockets in said chambers; and, a second pair of springs mounted externally of said revolver section and electrically isolated therefrom and disposed for engagement with said detent means to provide additional restraining force thereon for retention of said rockets in said chambers, said externally mounted springs being connected to said source of electrical energy, (g) interlocking means for completing the electrical firing circuit to said rockets only after sealing engagement of said revolver and launch tubes.

2. A rocket launcher as set forth in claim 1 wherein said detent means includes a body portion contoured to ride the surface of the rocket during loading thereof and to mate with a contact band provided on the rocket for controlled retention and firing of said rocket.

3. A rocket launcher as set forth in claim 2 wherein said rocket is provided with a contact band at the rear thereof and said detent means being disposed for engagement with said contact band responsive to positioning thereof in said revolver chambers.

4. A rocket launcher as set forth in claim 3 including an obturation band disposed about said rocket, said interlocking means disposed for engagement therewith to complete the ground circuit of said firing circuit responsive to positioning of said rockets in said revolver.

References Cited

UNITED STATES PATENTS

| 2,460,929 | 2/1949 | Goff | 89—1.807 |
| 2,742,820 | 4/1956 | Brown et al. | 89—1.807 |
| 2,870,678 | 1/1959 | Girouard et al. | 89—47 X |
| 3,059,543 | 10/1962 | Manz et al. | 89—1.807 |
| 3,331,284 | 7/1967 | Case, Jr., et al. | 89—135 |
| 3,435,726 | 1/1969 | Gabler | 89—1.807 |

SAMUEL W. ENGLE, Primary Examiner

U.S. Cl. X.R.

89—1.812, 135